United States Patent [19]
Rousselie et al.

[11] 3,786,917
[45] Jan. 22, 1974

[54] FRUIT-GRADING PLANT
[75] Inventors: Claude Joseph Rousselie, Saint Sylvain D'Anjou; Pierre Lacharlotte, Ecouflant, both of France
[73] Assignee: S. I. C. A. "Pomanjou", Ecouflant, Maine et Loire, France
[22] Filed: Feb. 4, 1972
[21] Appl. No.: 223,470

[30] Foreign Application Priority Data
Feb. 16, 1971 France .............................. 71.06558

[52] U.S. Cl. .................. 209/123, 214/301, 214/310
[51] Int. Cl. ................................................. B07c 7/00
[58] Field of Search ........... 214/300, 301, 309, 310; 209/123; 302/14, 15, 16; 53/248

[56] References Cited
UNITED STATES PATENTS
1,744,363   1/1930   Chapman .......................... 214/309
1,524,459   1/1925   Smith ................................ 214/310
3,583,579   6/1971   Triggs .............................. 214/6 BA

*Primary Examiner*—Robert G. Sheridan
*Assistant Examiner*—Lawrence J. Oresky
*Attorney, Agent, or Firm*—Karl F. Ross

[57] ABSTRACT

This fruit grading plant is of the type comprising an immersion-type emptying station, a transfer trough in which water is circulated for directing the fruits to a sorting and grading station, and a plurality of discharge troughs for feeding the graded fruits of each grade and/or size to a case filling station.

According to this invention, the plant comprises at least one vessel which, acting both as an emptying station and as a filling station, can be connected either to an emptying circuit or to a filling circuit, and is associated with handling means for immersing and retracting each case in or from the vessel. This plant is suitable for sorting and grading any fruits or other products or articles adapted to be transferred by buoyancy.

8 Claims, 10 Drawing Figures

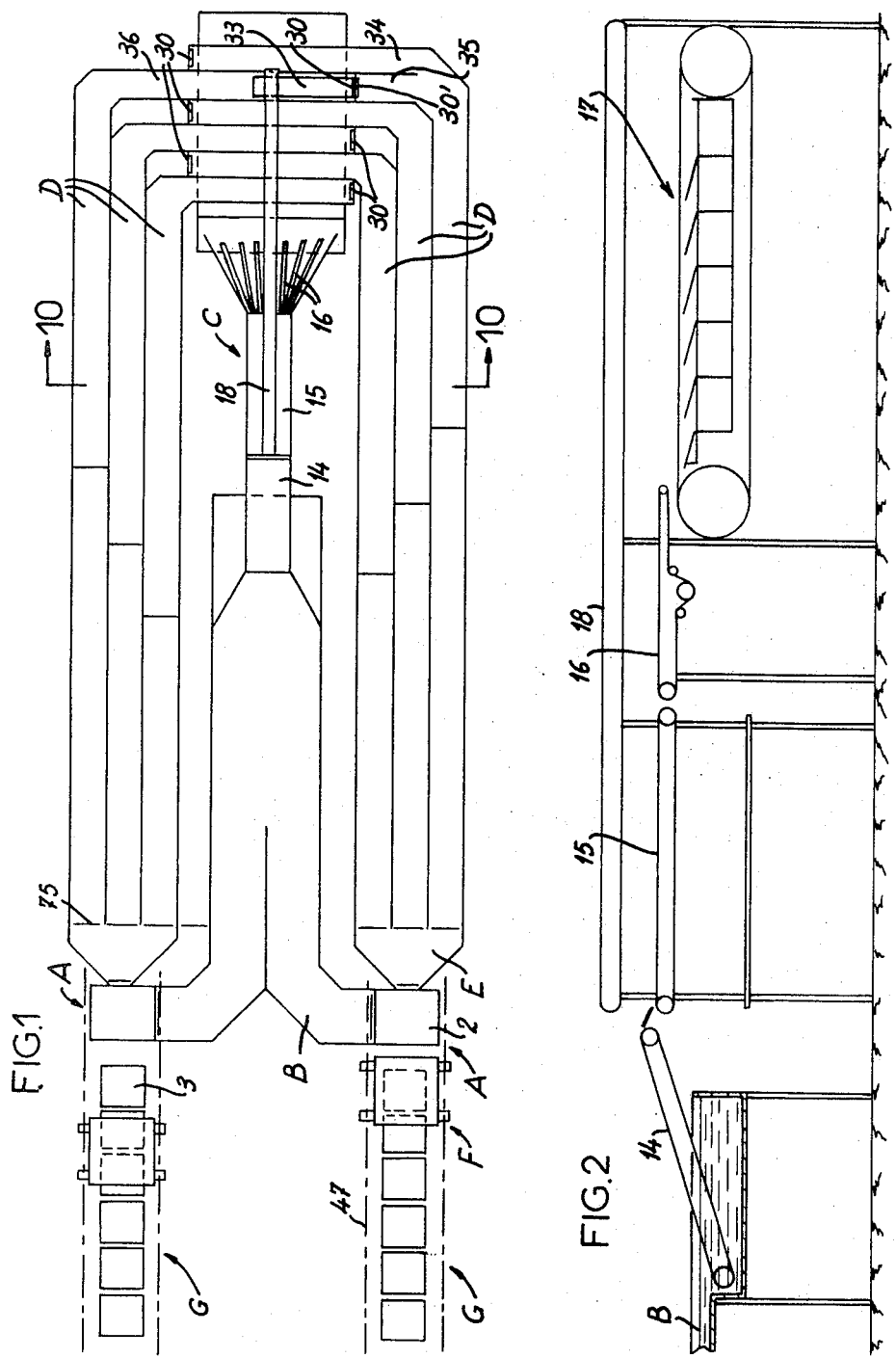

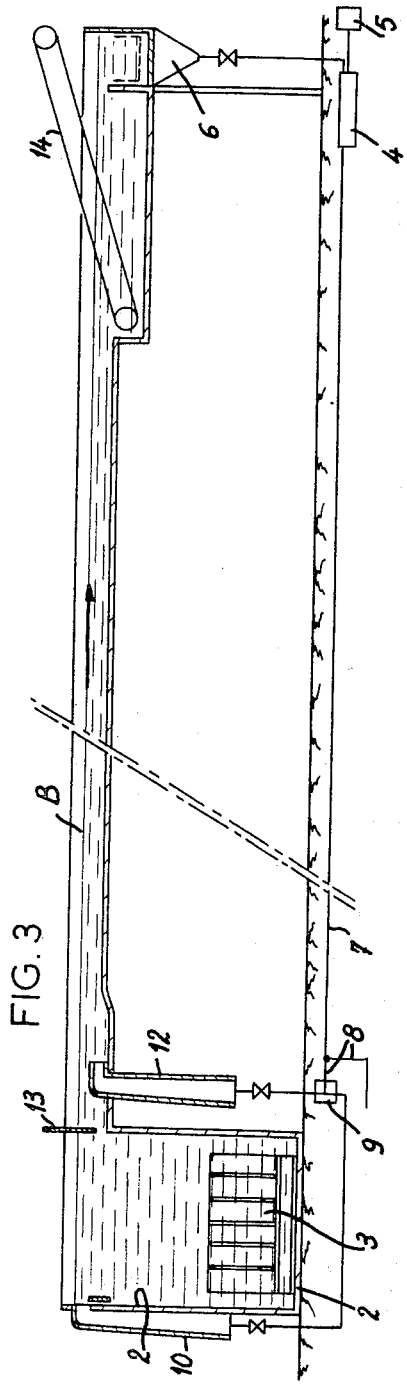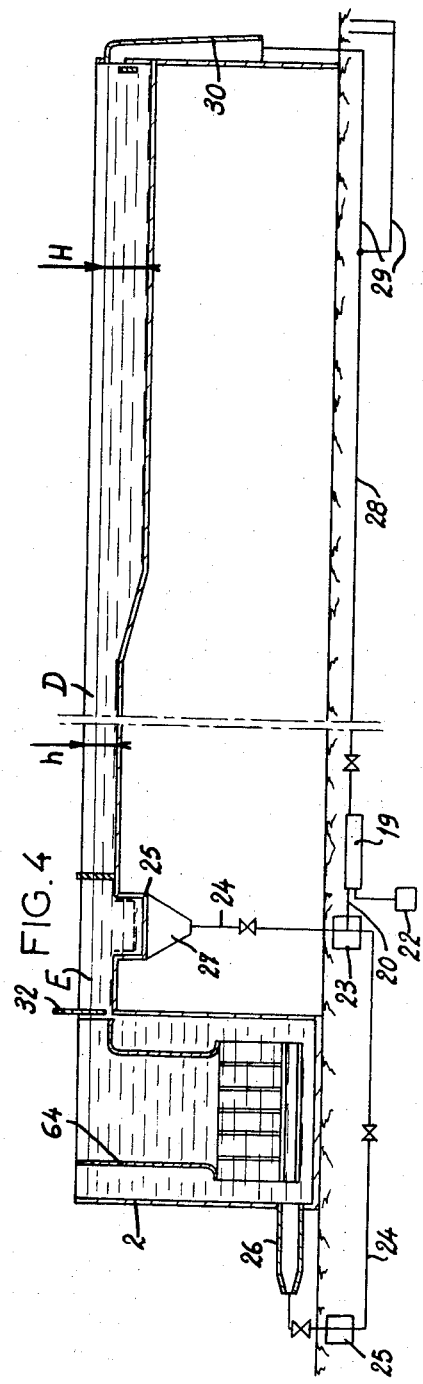

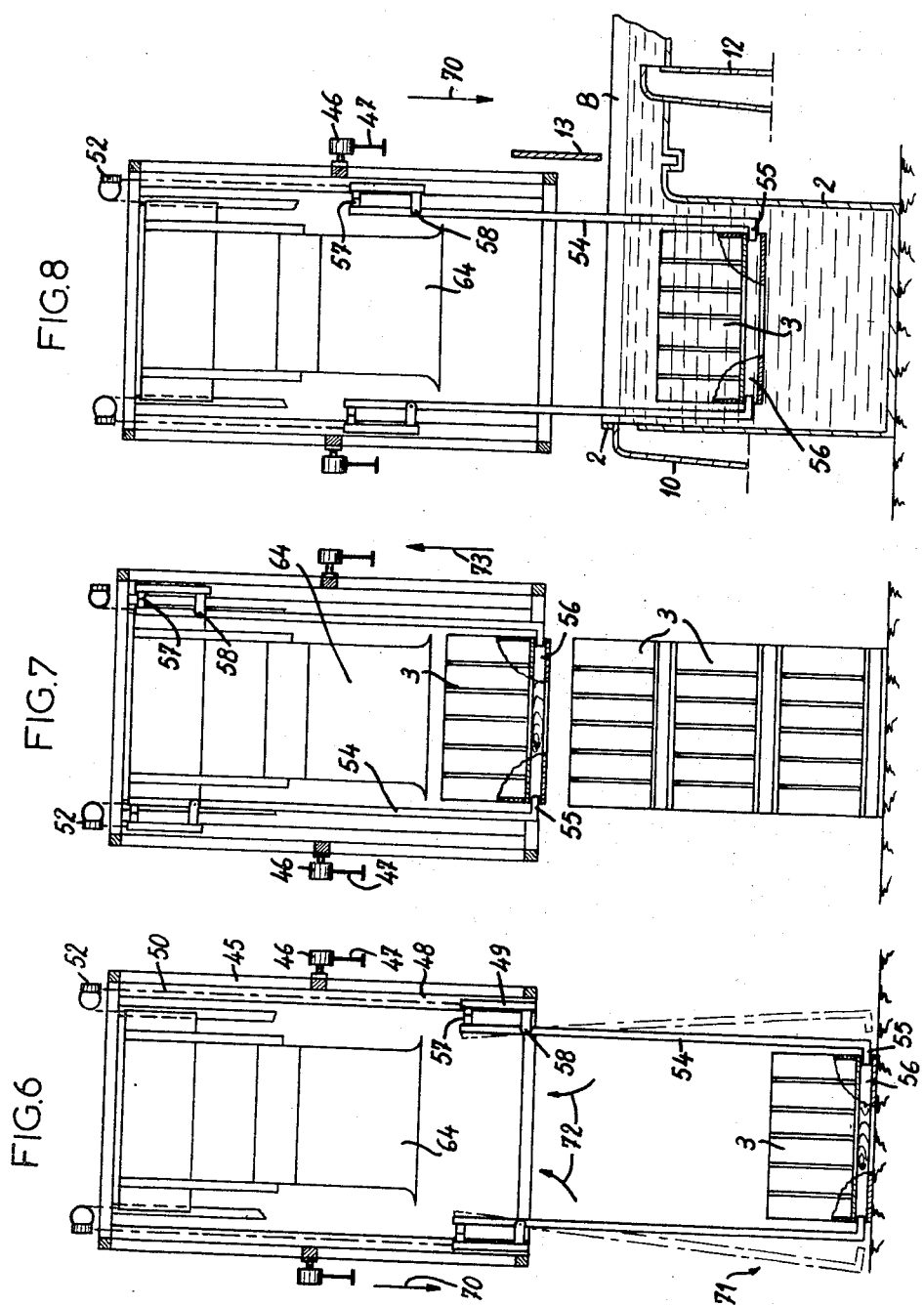

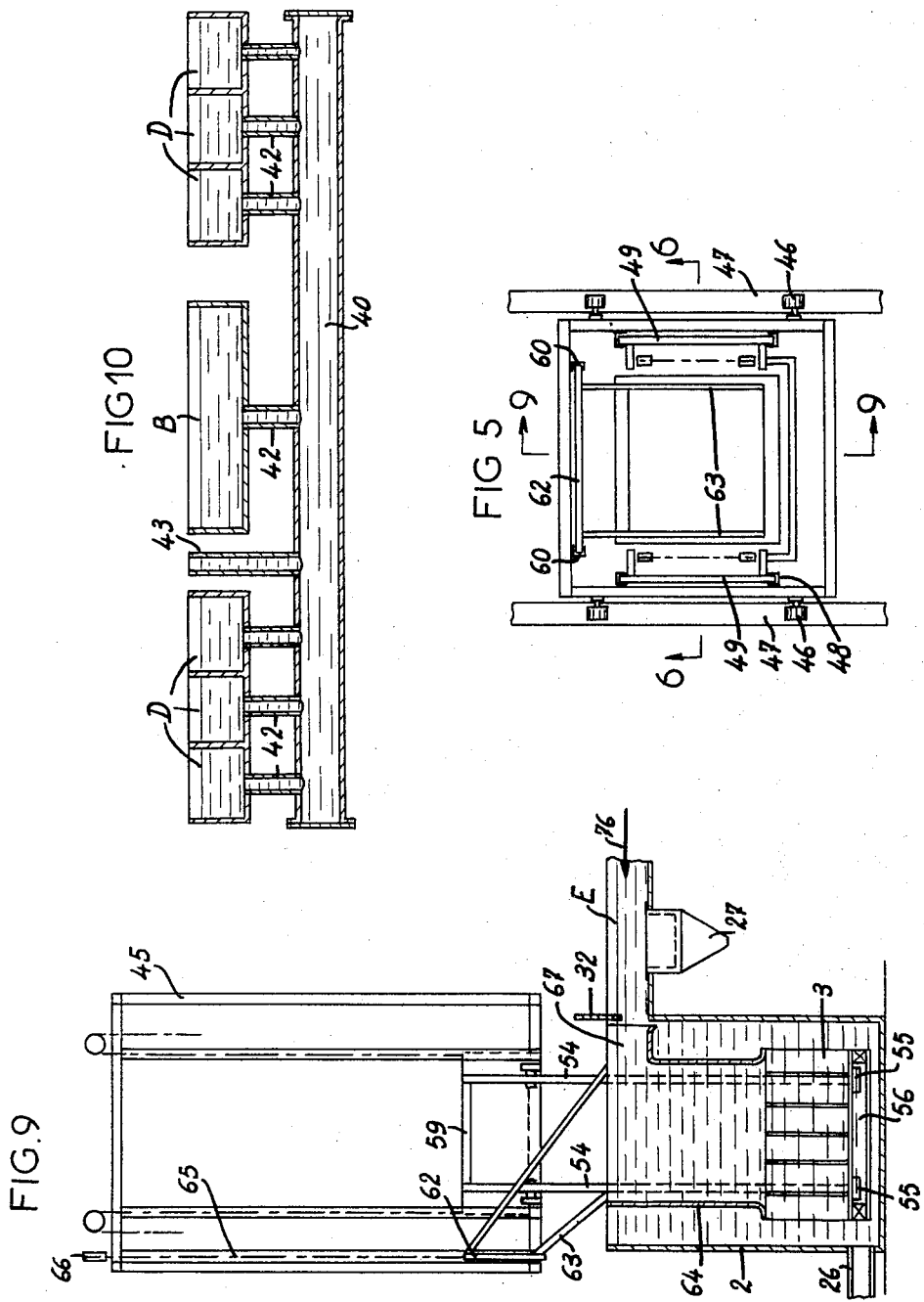

FRUIT-GRADING PLANT

BACKGROUND OF THE INVENTION

1. Field of the Invention

This invention relates to fruit grading plants of the type wherein the fruits are directed to the various stations of the plant by buoyancy in a flowing fluid.

2. Description of the Prior Art

PLants of this general type comprise as a rule an immersion-type emptying station wherein each palletizing case or crate is immersed to release the fruits contained therein, a transfer trough in which water is circulated for directing the fruits to a sorting and grading station, a plurality of discharge troughs for directing the sorted and graded fruits to a case filling station, and a set of pumps and valve means adapted to create and control the water circulation in the various troughs.

Hitherto, known plants of this character comprise at one end a case emptying station and at their other end a plurality of filling station corresponding in number to the fruit grades or sizes and therefore to the discharge troughs. Under these conditions, each time a case is emptied at the emptying station it must be removed therefrom and transferred to one of the filling stations and filled thereat with fruits all of the same grade or size. As a result, plants of this type require for proper operation a considerable number of handling apparatus for transferring the cases from one station to another, and this obviously entails a considerable loss of time.

Moreover, such plants require much labor for supervising and controlling the emptying and filling stations.

Moreover, due to the presence of a plurality of filling stations arranged at the line end opposite to the emptying stations, relatively complicated and therefore expensive hydraulic circuitry is required for the water circulation.

SUMMARY OF THE INVENTION

It is the essential object of this invention to avoid the inconveniences set forth hereinabove.

According to this invention, there is provided an improved plant for grading fruits and other buoyant articles or products, which comp rises at least one vessel having the dual function of emptying the cases and filling them, this vessel being adapted to be connected either to a hydraulic emptying circuit or to a hydraulic filling circuit and associated with handling means capable of immersing each case in said vessel and removing said case therefrom after discharging its contents and filling same with graded fruits or other articles having the same weight, size or grade.

Thus, when a case containing fruits to be sorted and graded is immersed in the water contained in the vessel the latter is connected firstly to the emptying circuit and subsequently, when all the fruits have been released from the case, to the filling circuit. When the case is filled, the filling circuit is turned off and the handling means are operated for removing this case from the vessel and directing same to a storage area.

From the foregoing it is clear that this improvement, in addition to the considerable simplification and economy brought in the plant construction, eliminates the time-robbing transfer of cases from one station to another, and more particularly increases the efficiency or rate of operation of the plant in general.

In a preferred form of embodiment of this invention, the vessel having a parallelipipedic configuration and an open top is connected on one side to the transfer trough directing the fruits to the grading station and on the other side to a collecting trough connected in turn, with the interposition of gates, to the discharge troughs from the sorting and grading station, and comprises gates for alternatively closing said transfer and collecting troughs.

The passage from the emptying cycle to the filling cycle is obtained on the one hand by reversing the direction of flow in the vessel and on the other hand by properly controlling the gates, notably by connecting said vessel to the filling circuit and isolating said vessel from the emptying circuit.

Advantageously, the emptying circuit may consist of a pump, notably of the Archimedean screw type having its suction side connected with the interposition of a filter to the downstream end of the transfer trough and its delivery side connected with the interposition of a control valve, notably of the three-way, and "on-and-off" type, to a pair of discharge ports opening by turns the one into the vessel and the other into the upstream end of the transfer trough.

Thus, when the emptying cycle is completed and the vessel isolated from the transfer trough, the latter remains the seat of a fluid circulation returning the fruits to the sorting and grading station.

Moreover, said filling circuit comprises a pump, preferably of the Archimedean screw type, having its suction side connected with the interposition of filtrer means and a control valve, notably a three-way, variable-output valve, on the one hand to a suction port disposed in the bottom of said vessel and, on the other hand, to another suction port disposed at the downstream end of said collector trough, the delivery side of said pump being connected to delivery ports opening each into one of the upstream ends of said discharge troughs.

Under these conditions, a fluid circulation is constantly maintained in the discharge troughs, even when the collector trough and the discharge troughs are isolated from the vessel, therefore also during the emptying cycle.

According to a preferred form of embodiment of this invention the handling means comprise : (a) a frame structure having mounted on either side rollers adapted to engage a track overlying the case storage area and the vessel, and on the other hand vertical slideways in which slides connected to means adapted to drive them vertically in either direction are engaged, and (b) arms disposed substantially vertically in their inoperative position, pivoted to said slides, and provided at their lower ends with studs engageable into gripping apertures of said palletizing cases ; the upper ends of said arms are connected to means controlling their pivotal movements in a vertical plane, said control means consisting for example of pressure-fluid actuators.

These handling means are advantageous in that their construction is relatively simple and that they are capable of properly and safely gripping the cases from the storage area. Moreover, these handling means are adapted to grip each case irrespective of its position in relation to the level of the storage area, so that the cases can be stacked or removed from existing stacks in a most reliable manner.

DESCRIPTION OF THE DRAWING

A complete understanding of the invention may be obtained from the foregoing and following description thereof taken together with the appended drawing wherein:

FIG. 1 is a diagrammatic plan view from above of the plant comprising in this specific form of embodiment two emptying and filling vessels;

FIG. 2 is a side elevational view showing on a larger scale the sorting and grading station of the plant of FIG. 1;

FIGS. 3 and 4 are fragmentary sectional views showing diagrammatically the emptying and filling circuits;

FIG. 5 is a plan view from above showing on a larger scale the handling means of the plant;

FIGS. 6, 7 and 8 are side-elevational and sectional views, the section being taken along the line 6—6 of FIG. 5, showing the handling means during the case gripping, transfer and immersion steps, respectively;

FIG. 9 is a side-elevational and part-sectional view, taken along the line 9—9 of FIG. 5, showing the handling means during the filling of a case; and FIG. 10 shows on a larger scale and in section taken along the line 10—10 of FIG. 1, the means for balancing the hydraulic circuits.

DESCRIPTION OF THE PREFERRED EMBODIMENT

This plant, as already mentioned in the foregoing, is of the type wherein the fruits or other articles are transferred from one station to another by buoyancy in a fluid stream or circulation, notably in water which may contain various additives.

This plant comprises two emptying and filling stations A connected to the two side branches of a transfer trough B, a sorting and grading station C, discharge troughs D and collecting troughs E.

According to this invention each station A comprises a vessel 2 for emptying and filling a number of palletizing cases or crates 3, or like containers, delivered thereto by handling devices F adapted to travel over a storage area G.

Each vessel 2 is connected on one side to one branch section of transfer trough B of an emptying circuit and on the other side to one of the collecting troughs E of the filling circuit.

The emptying circuit comprises said trough B extending from the vessel 2 to the upstream end of the sorting station C, and a pump 4 of the Archimedean screw type driven from a motor 5, the suction side of this pump being connected to a port equipped with suitable filter means 6 and disposed at the downstream end of said transfer trough B. The delivery side of pump 4 is connected via a pipe line 7 to a pair of branch of ducts 8 leading each to one way of a three-way valve 9 of the "on-and-off" type. The other two ways of each valve 9 are connected to discharge ports 10 and 12 opening the former into one of the aforesaid vessels 2 and the latter into the upstream end of the branch section of transfer trough B leading to this vessel. As shown more particularly in FIG. 3, each vessel 2 comprises a gate 13 adapted, when closed, to isolate the vessel from the transfer trough B.

An endless belt elevator 14 is provided between the transfer trough B and the sorting and grading station C, for picking up the fruits from said trough and delivering them to an inspection table 15. Feed conveyors 16 constitute the extension of said table 15 or directing the fruits to be graded to the grading machine proper 17. A discharge belt conveyor 18 extends above the table 15, conveyor 16 and grading machine 17 for disposing of spoiled fruits or fruits having a poor appearance, which are picked up from the table 15 by the personnel disposed on either side thereof.

The grading machine 17 of the eight-line and six-gage type in this specific form of embodiment is adapted to direct the fruits of each grade into one of the underlying troughs D. In this connection it may be pointed out that these troughs are directed alternatively to one or the other of the two stations A of the plant, in order to improve the distribution of the quantity of fruits delivered to these two stations and therefore balance the operation of these stations.

The graded fruits fall by gravity into one of the discharge troughs D which, at this location and as illustrated in FIG. 4, has a depth H greater than that $h$ measured along the greater part of their length. Thus the fall of each fruit is safely damped out and the fruits cannot strike the bottom of the troughs. Each fruit is subsequently fed to the collector trough E due to the water circulation created by the corresponding filling circuit. To this end, each vessel is associated with a filling circuit independent of that of the other vessel.

As illustrated in FIG. 4 each filling circuit comprises, in addition to the discharge troughs D and collecting trough E, a pump 19 of the Archimedean screw type driven from an electric motor 20. The suction side of this pump 19 is connected via a pipe line 22 to a three-way, adjustable-output valve 23 connected in turn through pipe lines 24 provided with filters 25 to a pair of suction ports 26 and 27. Port 26 is disposed at the bottom of vessel 2 and port 27 is disposed in the downstream section of collecting trough E leading to this vessel 2. The delivery side of pump 19 is connected via a common pipe line 28 to a plurality of branch lines 29 each leading to an extraction port 30 opening into the upstream section of one of the discharge troughs D connected to the corresponding collecting trough.

The filling assembly is completed by a gate 32 associated with each vessel 2 and adapted to isolate the corresponding vessel from the relevant collecting trough E.

In a known fashion the spoiled fruits deposited on the discharge belt 18 are poured by this belt onto a discharge conveyor 33 leading to the trough D for discharging the smallest fruits, i.e., the fruits deemed inadequate for sale. In fact, the downstream end of this trough is divided into two branches, i.e., a branch 34 receiving the smallest fruits and a branch 35 receiving the spoiled fruits. This branch 35 extends laterally and parallel to branch 34 as an extension of the upstream end 36 of one of the trough D leading to the other vessel 2. To prevent the spoiled fruits from stagnating in this branch 35, the discharge port 30 normally supplying the aforesaid trough 36 is associated with a secondary port 30' opening into said trough branch 35. The secondary port 30' is fed via the filling circuit delivering fruits to the port 30 opening into branch 34.

Also in a known fashion the various filling and emptying circuits of the plant are associated with a static balancing circuit shown in FIG. 10 and intended for keeping the water at a constant level in the various troughs. This balancing circuit comprises a header or manifold 40 connected to each trough B and D via ducts 42. Thus, by virtue of the principle of communicating vessels the water level in each trough is strictly the same as in the other troughs. Advantageously, a vertical and at least partially transparent duct 43 is connected to said header or manifold 40 to constitute a convenient level gage.

In a preferred form of embodiment of this invention, the handling means associated with each vessel 2 comprise a frame structure 45 provided with lateral supporting rollers 46 adapted to roll on tracks 47 extending horizontally above the storage area G and the relevant vessel 2. The frame structure 45 also comprises vertical inner slideways 48 engaged by slides 49 (FIG. 5 to 9). These slides 49 are connected to means adapted to drive them up and down, notably to chains 50 passing over return sprockets 52 and driving sprockets (not shown) keyed to the output shaft of a motor and reduction gearing unit adapted to rotate in both directions. Each slide 49 carries adjacent its lower end substantially horizontal lugs provided in turn at their lower ends with longitudinally extending pivot pins 58 from which elongated arms 54 are pivotally suspended. Each arm 54 carries at its lower end a transverse stud 55 engageable into one of the gripping apertures 56 formed in each palletizing case or crate 3 and has its upper end connected to a pneumatic actuator 57 adapted to move the relevant arm 54 angularly about the pivot pins 58 in a transverse plane, as illustrated in dot-dash lines in FIG. 6.

In this embodiment each slide 49 carries two arms 54 interconnected by cross members 59.

The frame structure 45 carries another vertical slideway 60 in which a slide 62 is fitted ; this slide 62 carries in turn, through a pair of arms 63, a hopper 64. This slide 62 is Connected to chains 65 passing over return sprockets 66 and driving sprockets (not shown), keyed to the output shaft of a motor and reduction gearing unit adapted to rotate in either direction.

As shown more in detail in FIG. 9 the hopper 64 has transverse dimensions inferior to those of the case or crate 3 over which it will be lowered during the filling operation. This hopper 64 comprises at its upper end a lateral beak forming a partial trough 67 and shaped and dimensioned to constitute, in the lower position of said hopper, an extension of the corresponding collecting trough E in order properly to guide the fruits during the filling operation.

The fruits contained in cases or crates stacked to form piles of say three each on the storage area G are sorted and graded as follows :

The handling means F associated with one of the vessels 2 are moved along the track 47 and stopped just above the pile of cases 3 containing the fruits to be sorted and graded. Then the slides 49 are lowered as shown by the arrow 70 of FIG. 6 until the transverse studs 55 of arms 54 are level with the aperture 56 provided in the bottom of the corresponding palletizing case. In this position the actuators 57 are operated so that the arms 54 then in the positions shown in dot-dash lines in FIG. 6 are pivoted about their pivot pins 58 in the directions of the arrows 72 to the position shown in solid lines in the same Figure. As a consequence of this pivotal movement the studs 55 engage the apertures 56 of palletizing case 3 and thus the latter can be lifted by said arms. To this end, the slides 49 are raised (arrow 73, FIG. 7) until the lower or bottom face of the case is at a higher level than the top of the corresponding vessel 2, and possibly than the three-case piles stacked in the storage area G and lying in the path of said frame structure 45.

When the frame structure 45 has been properly positioned above the vessel 2 the slides 49 are lowered in the direction of the arrow 70 to place the case 3 and the fruits contained therein into the water filling this vessel 2. At that time the gate 13 interposed between the vessel 2 and the transfer trough B is opened as shown in FIG. 8. Simultaneously, the three-way valve 9 of the hydraulic emptying circuit is actuated to direct the output of pump 4 only towards the discharge port 10 (FIG. 3). Thus, water circulation is created in the vessel, in the direction of the arrow 74 of FIG. 8. Of course, the fruits extracted by buoyancy from the cases 3 are carried along by the stream thus produced and directed to the transfer trough B. When the case 3 is emptied completely, the gate 9 is operated again to cause the entire pump output to be discharged through the port 12 alone. Simultaneously, gate 13 is re-closed.

The fruits just extracted from the case 3 being handled are thus caused to travel along the transfer trough, picked up by the elevator belt 14, and subsequently directed to the sorting and grading station C.

When the case 3 has been emptied completely, it is lowered to the bottom of vessel 2 as shown in FIG. 9 and covered with the hopper 64. AT the same time, the filling circuit three-way valve 22 is operated to connect the suction port 26 to the suction side of pump 19. Moreover, the gate 32 between the vessel 2 and collecting trough E is restored to its open position while one of the gates 75 (FIG. 1) provided in the discharge troughs D is moved to its open position. The fruits contained in the trough having its gate 75 thus moved to its open position are carried by the water circulation produced between the corresponding delivery port 30 and the suction port 26 provided at the bottom of the vessel 2. Thus, the fruits travel in the direction of the arrow 76 of FIG. 9 and successively along the collecting trough E and the trough section 67 of hopper 64, and then down through this hopper 64 to a position between the bottom of the underlying crate or case 3 and the upper level of the water contained in vessel 2. When the amount of fruits required for filling completely a case 3 (which is determined by using any suitable and known gaging method and means) has been introduced into the hopper 64, the gate 32 is re-closed and at the same time the suction port 27 is substituted for the other suction port 26. The case 3 and hopper 64 are then extracted from the vessel 2 at a rate slow enough to permit the draining of the water and a proper distribution of the fruits in the case 3. Thereafter the hopper 64 is raised back to the upper portion of frame structure 45 and the filled case 3 is brought to the position shown in FIG. 7. The handling means are subsequently operated to direct the case to the storage area G corresponding to the particular grade concerned and, by actuating the pneumatic actuators 57, the case is released. The handling means are moved again in the opposite direction along the track for taking another case filled with fruits to be sorted and graded.

Experience proves that the use of a same vessel 2 for emptying and filling the cases or crates 3 permits of reducing considerably the idle periods, eliminating the handling of cases from one station to another and, consequently, improves considerably the efficiency of the fruit grading plant.

In the specific form of embodiment shown and described herein the plant comprises two case emptying and filling stations, but of course only one station could be provided if this were justified by the amount of fruits to be treated in one hour.

A specific feature of the plant of this invention, which has the dual advantage of reducing its initial cost and avoiding any preliminary earthmoving works, is that all the troughs are located well above ground level.

As already mentioned in the foregoing, although this plant is intended more particularly for sorting and grading fruits, it is also suitable for grading other products or articles, whether in the food industry or in other trades, adapted to be conveyed by buoyancy.

We claim:

1. A plant for sorting and grading fruit comprising an immersion-type emptying station whereas each palletizing case or crate is immersed to release the fruits contained therein, a transfer through in which water is circulated for delivering the fruits to a sorting and grading station, a plurality of discharge troughs for directing the sorted and graded fruit according to their respective grade to a case-filling station, a set of pumps, gates and valves associated with circuit means for creating directing and controlling the water circulation in the various troughs, and at least one vessel forming said emptying station and said filling station and adapted to be connected either to a hydraulic emptying circuit or to a hydraulic filling circuit, said vessel being associated with handling means capable of immersing each case into the vessel for emptying the case and subsequently removing this case after it has been filled with similar fruit.

2. A plant for sorting and grading fruit, or the type wherein the fruits are delivered to the various treatment stations of the plant by floating in a moving fluid stream comprising an immersion-type emptying station, whereat each palletizing case or crate is immersed to release the fruits contained therein, a transfer trough in which water is circulated for delivering the fruits to a sorting and grading station, a plurality of discharge troughs for directing the sorted and graded fruit according to their respective grade to a case-filling station, a set of pumps, gates and valves associated with circuit means for creating directing and controlling the water circulation in the various troughs, and at least one vessel forming said emptying station and said filling station and adapted to be connected either to a hydraulic emptying circuit or to a hydraulic filling circuit, said vessel being associated with handling means capable of immersing each case into the vessel for emptying the case and subsequently removing this case after it has been filled with similar fruit, said vessel being of parallelepipedic configuration and open at the top, and connected laterally on one side with a transfer trough for directing the fruits to the grading station and on the other side with a collecting trough connected in turn with the interposition of gate means to the discharge troughs from the sorting and grading station, suitable valve means being provided for closing by turns the aforesaid transfer and collecting troughs.

3. Plant as set forth in claim 2, wherein said emptying circuit comprises a pump, notably of the Archimedean screw type, having its suction side connected with the inter-position of suitable filter means to the downstream end of said transfer trough and its delivery side connected with the inter-position of a suitable control valve to a pair of discharge ports opening by turns the one into said vessel and the other into the upstream end of said transfer trough.

4. Plant as set forth in claim 3, wherein said emptying circuit control valve is a three-way, "on-and-off" valve.

5. Plant as set forth in claim 4, wherein said filling circuit comprises a pump, preferably of the Archimedean screw type, having its suction side connected with the inter-position of filter means and a control valve on the one hand to a suction port disposed in the bottom of said vessel and on the other hand to a suction port disposed in the downstream end of said collecting trough, the delivery side of said pump being connected to delivery ports opening each into one of the upstream ends of said discharge troughs.

6. Plant as set forth in claim 5, wherein said filling circuit control valve is a three-way, adjustable-output valve.

7. Plant as set forth in claim 6, wherein said handling means comprise
   a. a frame structure comprising on two opposite sides supporting roller adapted to roll on a track overlying the case storage area and said vessel, and vertical slideways engaged by slides connected to means adapted to move said slides vertically along said slideways, and
   b. lever means comprising arms substantially vertical in their inoperative position and pivoted to said slides, said arms carrying at their lower ends studs engageable into gripping apertures formed in the palletizing cases or crates, said arms having their upper ends connected to means for controlling their pivotal movements in a vertical plane, said control means consisting preferably of fluid-operated actuators.

8. Plant as set forth in claim 7, wherein the frame structure of said handling means comprises other vertical slideways in which other slides are mounted, said other slides being rigid with a hopper and connected to means capable of driving said slides and hopper up and down along said other slideways for bringing said hopper either into said vessel over the case to be filled or out from said vessel after the filling of said case.

* * * * *